United States Patent
Butler et al.

(10) Patent No.: US 8,181,850 B2
(45) Date of Patent: May 22, 2012

(54) ANTI-TAMPER USING BARCODE DEGRADATION

(75) Inventors: Roger David Butler, Rozelle New South Wales (AU); Alan Gordon Doubleday, Macquarie Park New South Wales (AU); Matthew Christian Duggan, Tokyo-to (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/939,423

(22) Filed: Nov. 4, 2010

(65) Prior Publication Data

US 2011/0127321 A1 Jun. 2, 2011

(30) Foreign Application Priority Data

Nov. 27, 2009 (AU) ................................ 2009243403

(51) Int. Cl.
*G06F 17/00* (2006.01)
(52) U.S. Cl. .................. 235/375; 235/462.1; 235/454
(58) Field of Classification Search .................. 235/375, 235/462.09, 462.1, 454
See application file for complete search history.

(56) References Cited

U.S. PATENT DOCUMENTS

| | | | |
|---|---|---|---|
| 5,091,966 A | | 2/1992 | Bloomberg et al. |
| 5,128,525 A | | 7/1992 | Stearns et al. |
| 5,912,974 A | | 6/1999 | Holloway et al. |
| 6,189,009 B1 * | | 2/2001 | Stratigos et al. ............ 1/1 |
| 6,567,533 B1 | | 5/2003 | Rhoads |
| 6,795,213 B1 | | 9/2004 | Hanyu |
| 7,054,461 B2 | | 5/2006 | Zeller et al. |
| 7,237,721 B2 | | 7/2007 | Bilcu et al. |
| 7,669,769 B2 * | | 3/2010 | Tomita ................ 235/462.09 |
| 7,677,456 B2 | | 3/2010 | Uchida et al. |
| 2003/0169456 A1 * | | 9/2003 | Suzaki .................... 358/3.28 |
| 2005/0258247 A1 * | | 11/2005 | Hawes .................... 235/454 |
| 2007/0007349 A1 | | 1/2007 | Uchida et al. |
| 2009/0238626 A1 | | 9/2009 | Ming et al. |

OTHER PUBLICATIONS

W. Turin, R.A. Bie, "Bar code recovery via the EM algorithm", IEEE Trans. on Signal Processing, 46(2), 1998, pp. 354-363.
"Deconvolution of the two-dimensional bar code based on binary constraint", 2008 International Conference on Computer Science and Software Engineering, by Ning Zhong Liu, Han Sun, College of Information Science & Technology, Nanjing Univ. of Aeronautics and Astronautics, Nanjing, China, pp. 806-809, LiuNZ@163.com.
Examiner's Report dated Nov. 8, 2011, issued by the Australian Patent Office, in Australian Patent Application No. 2009243403.

* cited by examiner

*Primary Examiner* — Daniel StCyr
(74) *Attorney, Agent, or Firm* — Fitzpatrick, Cella, Harper & Scinto

(57) ABSTRACT

A method of authenticating a first document (270) including content (271) and a barcode (272). The barcode (272) comprising barcode elements each having a predetermined form. A plurality of the barcode elements of the barcode are detected in a representation of the first document (270). A visual difference between each of the detected barcode elements and the predetermined form of the barcode element is determined. The barcode (272) is decoded to determine a second document. The first document (270) and the second document are compared based on the determined visual difference, in order to authenticate the first document (270).

26 Claims, 9 Drawing Sheets

ANTI-TAMPER USING BARCODE DEGRADATION

CROSS-REFERENCE TO RELATED PATENT APPLICATIONS

This application claims the right of priority under 35 U.S.C. §119 based on Australian Patent Application No. 2009243403, filed 27 Nov. 2009, which is incorporated by reference herein in its entirety as if set forth herein.

FIELD OF INVENTION

The present invention relates generally to documents and, in particular, to detecting tamper of a protected document. The present invention also relates to a method and apparatus for modifying a document including content and a barcode, and to a computer program product including a computer readable medium having recorded thereon a computer program for modifying a document including content and a barcode.

DESCRIPTION OF BACKGROUND ART

Within the field of document security, machine-readable marks, known as barcodes, are often appended to printed documents in order to convey security information. The barcode is printed on a label or onto the document itself. To extract the security information, a barcode reader scans the document, detects the barcode, and decodes the security information from the barcode.

One application of document security is to ensure that a printed document has not been altered or subject to tampering in some unauthorized manner from the time the document was first printed. For example, a contract that has been agreed upon and signed on a particular date may subsequently be fraudulently altered and it is desirable to be able to detect such alterations in detail. Similarly, security documents of various sorts, such as cheques and monetary instruments for recording values, are vulnerable to fraudulent alteration. Detection of any fraudulent alteration in such documents is therefore desirable. Further, it is desirable that such detection be performed automatically, and that the detection reveals the nature of any alteration.

Various methods of document tamper detection have been proposed and used. One approach to tamper detection uses watermarks or two-dimensional (2D) barcodes printed on the document to encode information about the original document contents. The encoded document is then printed and distributed to recipients. When the document contents are to be verified, the document is scanned to extract the encoded information from the watermark or 2D barcode. The encoded information is then compared to the respective features of the suspect document. Any changes between the encoded representation of the original document and the suspect document represent a possible instance of tampering. However, the printing and scanning processes themselves produce changes to the content of the document, resulting in a suspect document that is different from the encoded document. These changes are difficult to distinguish from tamper.

SUMMARY OF THE INVENTION

It is an object of the present invention to substantially overcome, or at least ameliorate, one or more disadvantages of existing arrangements.

According to one aspect of the present invention there is provided a method of authenticating a first document including content and a barcode, said barcode comprising barcode elements each having a predetermined form, said method comprising the steps of: detecting a plurality of the barcode elements of the barcode in a representation of the first document;

determining a visual difference between each of the detected barcode elements and the predetermined form of the barcode element;

decoding the barcode to determine a second document; and comparing the first document and the second document based on the determined visual difference, in order to authenticate the first document.

According to another aspect of the present invention there is provided a method of modifying a first document including content and a barcode encoding data related to the first document, said barcode comprising barcode elements each having a predetermined form, said method comprising the steps of:

detecting a plurality of the barcode elements of the barcode in a representation of the first document;

determining a visual difference between each of the detected barcode elements and the predetermined form of the barcode element; and removing at least some of the degradation of the content of the first document based on the determined visual difference, in order to compensate for degradation of the first document.

According to still another aspect of the present invention there is provided an apparatus for authenticating a first document including content and a barcode, said barcode comprising barcode elements each having a predetermined form, said apparatus comprising:

means for detecting barcode elements of the barcode in a representation of the first document;

means for determining a visual difference between each of the detected barcode elements and the predetermined form of the barcode element;

means for decoding the barcode to determine a second document; and means for comparing the first document and the second document based on the determined visual difference, in order to authenticate the first document.

According to still another aspect of the present invention there is provided a system for authenticating a first document including content and a barcode, said barcode comprising barcode elements each having a predetermined form, said system comprising:

a memory for storing data and a computer program; and a processor coupled to said memory for executing said computer program, said computer program comprising instructions for:

detecting a plurality of the barcode elements of the barcode in a representation of the first document;

determining a visual difference between each of the detected barcode elements and the predetermined form of the barcode element;

decoding the barcode to determine a second document; and comparing the first document and the second document based on the determined visual difference, in order to authenticate the first document.

According to still another aspect of the present invention there is provided a computer readable medium having a computer program recorded thereon for authenticating a first document including content and a barcode, said barcode comprising barcode elements each having a predetermined form, said program comprising:

code for detecting a plurality of the barcode elements of the barcode in a representation of the first document;

code for determining a visual difference between each of the detected barcode elements and the predetermined form of the barcode element;

code for decoding the barcode to determine a second document; and comparing the first document and the second document based on the determined visual difference, in order to authenticate the first document.

According to still another aspect of the present invention there is provided an apparatus for modifying a first document including content and a barcode encoding data related to the first document, said barcode comprising barcode elements each having a predetermined form, said apparatus comprising:

means for detecting a plurality of the barcode elements of the barcode in a representation of the first document;

means for determining a visual difference between each of the detected barcode elements and the predetermined form of the barcode element; and means for removing at least some of the degradation of the content of the first document, using the representation, based on the determined visual difference, in order to compensate for degradation of the first document.

According to still another aspect of the present invention there is provided a system for modifying a first document including content and a barcode encoding data related to the first document, said barcode comprising barcode elements each having a predetermined form, said system comprising:

a memory for storing data and a computer program; and a processor coupled to said memory for executing said computer program, said computer program comprising instructions for:

detecting a plurality of the barcode elements of the barcode in a representation of the first document;

determining a visual difference between each of the detected barcode elements and the predetermined form of the barcode element; and removing at least some of the degradation of the content of the first document, using the representation, based on the determined visual difference, in order to compensate for degradation of the first document.

According to still another aspect of the present invention there is provided a computer readable medium having a computer program recorded thereon for modifying a first document including content and a barcode encoding data related to the first document, said barcode comprising barcode elements each having a predetermined form, said program comprising:

code for detecting a plurality of the barcode elements of the barcode in a representation of the first document;

code for determining a visual difference between each of the detected barcode elements and the predetermined form of the barcode element; and code for removing at least some of the degradation of the content of the first document, using the representation, based on the determined visual difference, in order to compensate for degradation of the first document.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Methods of authenticating a printed document containing a barcode that is collocated with content of the document are described below. The described methods use knowledge of the form of the barcode to estimate the degradation that occurred during printing and subsequent scanning processes. The estimate of barcode degradation is used to compensate for degradation of the content of the document. The compensation improves a comparison between the content of the document and a representation of an original document extracted from the barcode. Thus, the detection of tamper of the content of the document is more robust to printing and scanning degradation.

Figure 1A:
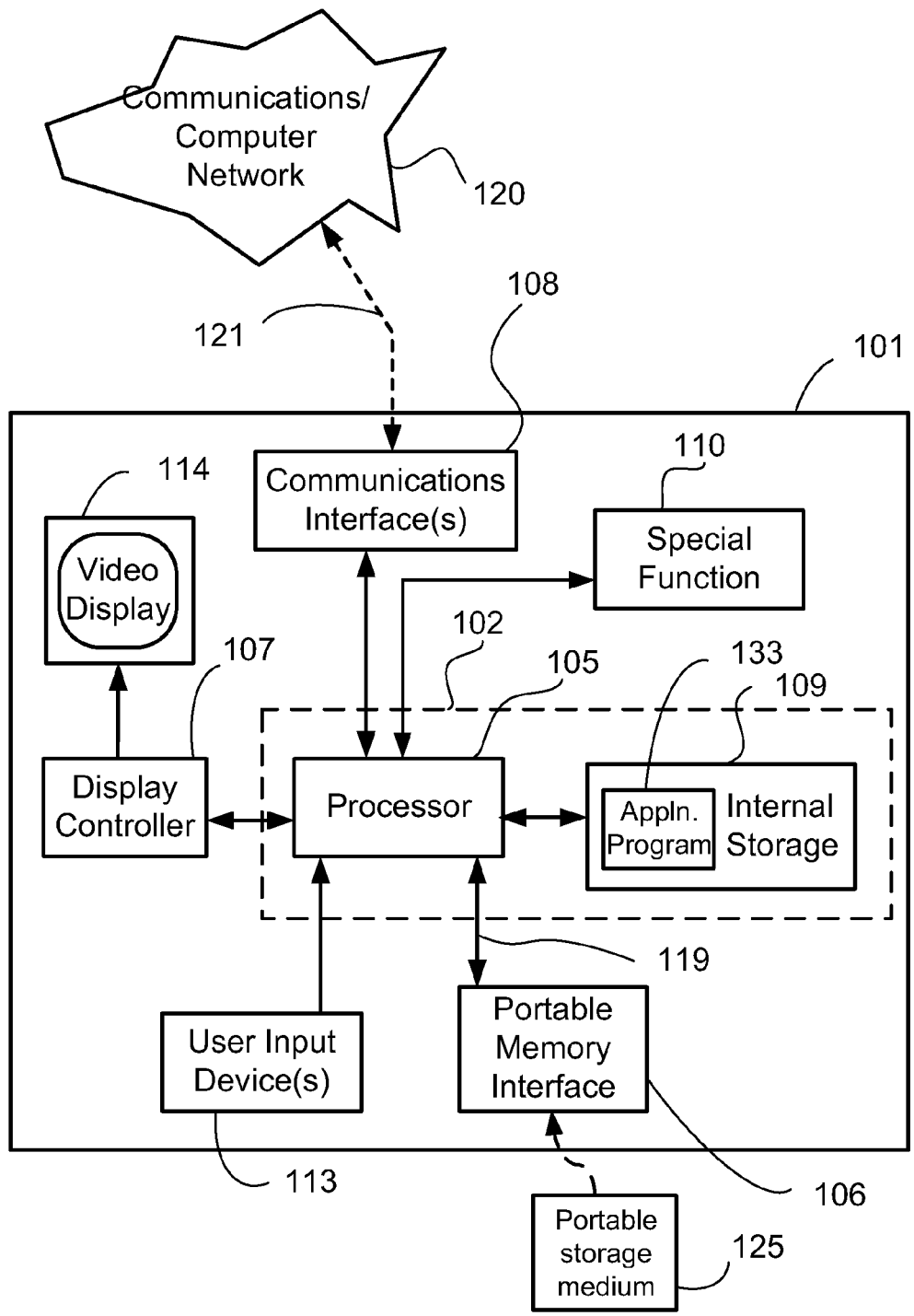
FIGS. 1A and 1B form a schematic block diagram representation of an electronic device upon which the described arrangements can be practiced.
Figure 1B:
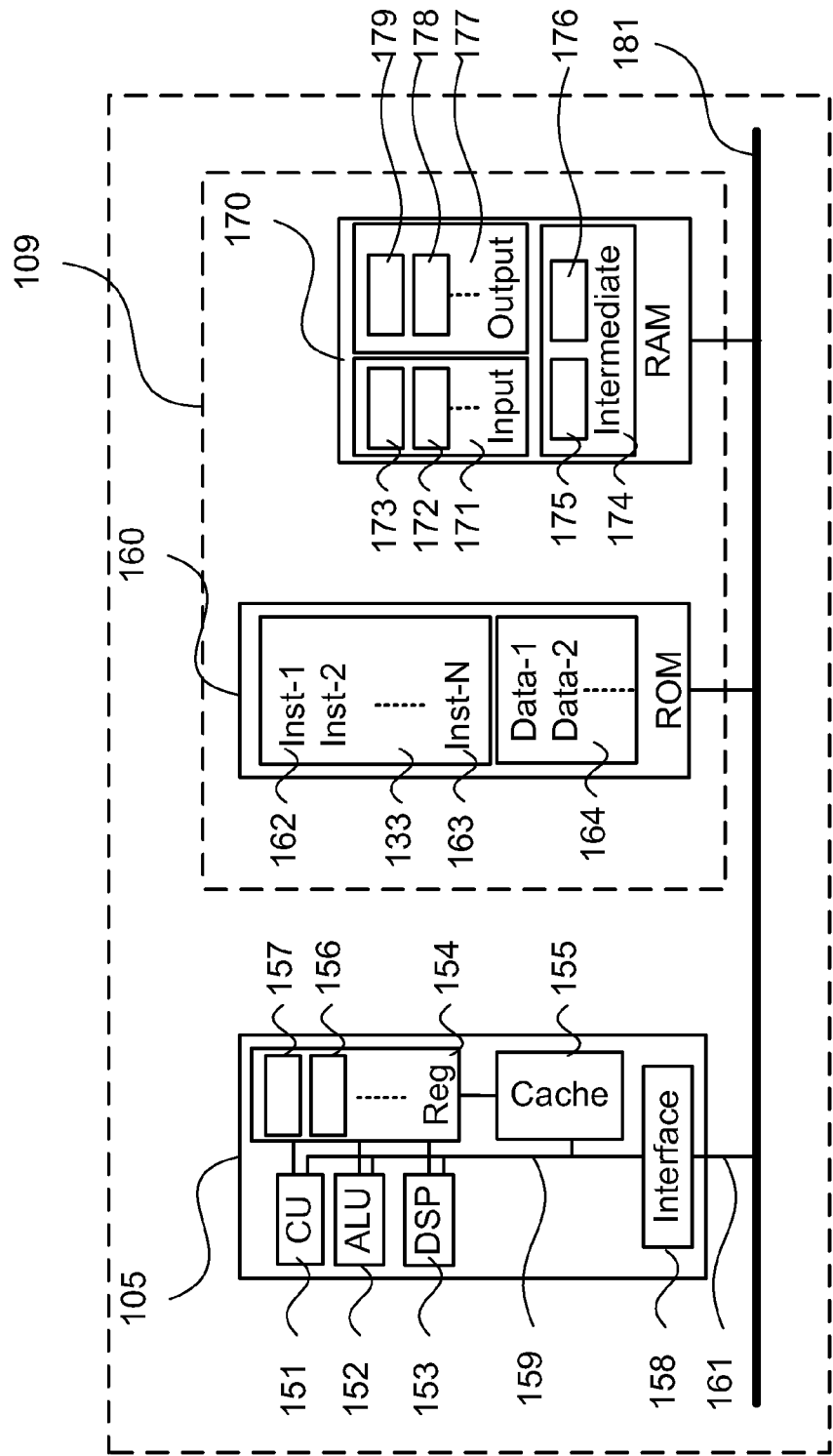

FIGS. 1A and 1B collectively form a schematic block diagram of a general purpose electronic device 101 comprising embedded components, upon which the methods to be described are desirably practiced. In the example of FIGS. 1A and 1B, the electronic device 101 is a multi-function printer including a scanning function. Alternatively, the electronic device 101 may be, for example, a scanner, mobile phone, a portable media player or a digital camera, in which processing resources are limited. Nevertheless, the methods to be described below may also be performed on higher-level devices such as desktop computers, server computers, and other such devices with significantly larger processing resources.

As seen in FIG. 1A, the electronic device 101 comprises an embedded controller 102. Accordingly, the electronic device 101 may be referred to as an "embedded device." In the present example, the controller 102 comprises a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 1B. The RAM 170 may be volatile, non-volatile or a combination of volatile and non-volatile memory.

The electronic device 101 comprises a display controller 107, which is connected to a display 114, such as a liquid crystal display (LCD) panel or the like. The display controller 107 is configured for displaying graphical images on the display 114 in accordance with instructions received from the processor 105.

The electronic device 101 also comprises user input devices 113 typically formed by keys, a keypad or like controls. In some implementations, the user input devices 113 may include a touch sensitive panel physically associated with the display 114 to form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1A, the electronic device 101 also comprises a portable memory interface 106, which is coupled to the processor 105 via a connection 119. The portable memory interface 106 allows a complementary portable memory device 125 to be coupled to the electronic device 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 101 also comprises a communications interface 108 to permit coupling of the device 101 to a computer or communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 101 is configured to perform some special function. The embedded controller 102, possibly in conjunction with further special function components 110, is provided to perform that special function. In the described example the electronic device 101 is a multi-function printer/scanner and the components 110 may represent a scanning unit, a corona wire, a discharge lamp and a photoreceptor drum assembly. As another example, where the device 101 is a digital camera, the components 110 may represent a lens, focus control and image sensor of the camera. As another example, the device 101 may be a mobile telephone handset. In this instance, the components 110 may represent those components required for communications in a cellular telephone environment. Where the device 101 is a portable device, the special function components 110 may represent a number of encoders and decoders of a type including Joint Photographic Experts Group (JPEG), (Moving Picture Experts Group) MPEG, MPEG-1 Audio Layer 3 (MP3), and the like.

The methods described below may be implemented using the embedded controller 102 wherein the processes of FIGS. 2 to 8, to be described, may be implemented as one or more software application programs 133 executable within the embedded controller 102.

The electronic device 101 is an effective and advantageous apparatus for implementing the described methods. In particular, with reference to FIG. 1B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 is generally loaded into the controller 102 from a computer readable medium, and is then typically stored in the ROM 160 of the internal storage module 109, as illustrated in FIG. 1A, after which the software 133 can be executed by the processor 105. In some instances, the processor 105 may execute software instructions that are located in RAM 170. Software instructions may be located in RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

As described herein, the application program 133 is typically pre-installed and stored in the ROM 160 by a manufacturer, prior to distribution of the electronic device 101. However, in some instances, the application programs 133 may be supplied to the user encoded on one or more CD-ROM (not shown) and read via the portable memory interface 106 prior to storage in the internal storage module 109 or in the portable memory 125. In another alternative, the software application program 133 may be read by the processor 105 from the network 120 or loaded into the controller 102 or the portable storage medium 125 from other computer readable media. Computer readable storage media refers to any storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 101. Examples of computer readable transmission media that may also participate in the provision of software, application programs, instructions and/or data to the device 101 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114. Through manipulation of the user input device 113 (e.g., the keypad), a user of the device 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 1B is a detailed schematic block diagram of the controller 102 comprising the processor 105 for executing the application programs 133, and the internal storage 109. The internal storage 109 comprises read only memory (ROM) 160 and random access memory (RAM) 170. The processor 105 is able to execute the application programs 133 stored in one or both of the connected memories 160 and 170. When the electronic device 102 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 typically containing atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 though 163 that may include conditional branch and loop instructions. The program 133 may also include data used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the electronic device 101. Typically, the application program 133 will wait for events and subsequently execute the block of code associated with that event. Events may be triggered in response to input from a user, via the user input devices 113, as detected by the processor 105. Events may also be triggered in response to other sensors and interfaces in the electronic device 101.

The execution of a set of the instructions may require numeric variables to be read and modified. Such numeric variables are stored in the RAM 170. The disclosed method uses input variables 171 that are stored in known locations 172, 173 in the memory 170. The input variables are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing, for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the electronic device 101.

Figure 2:
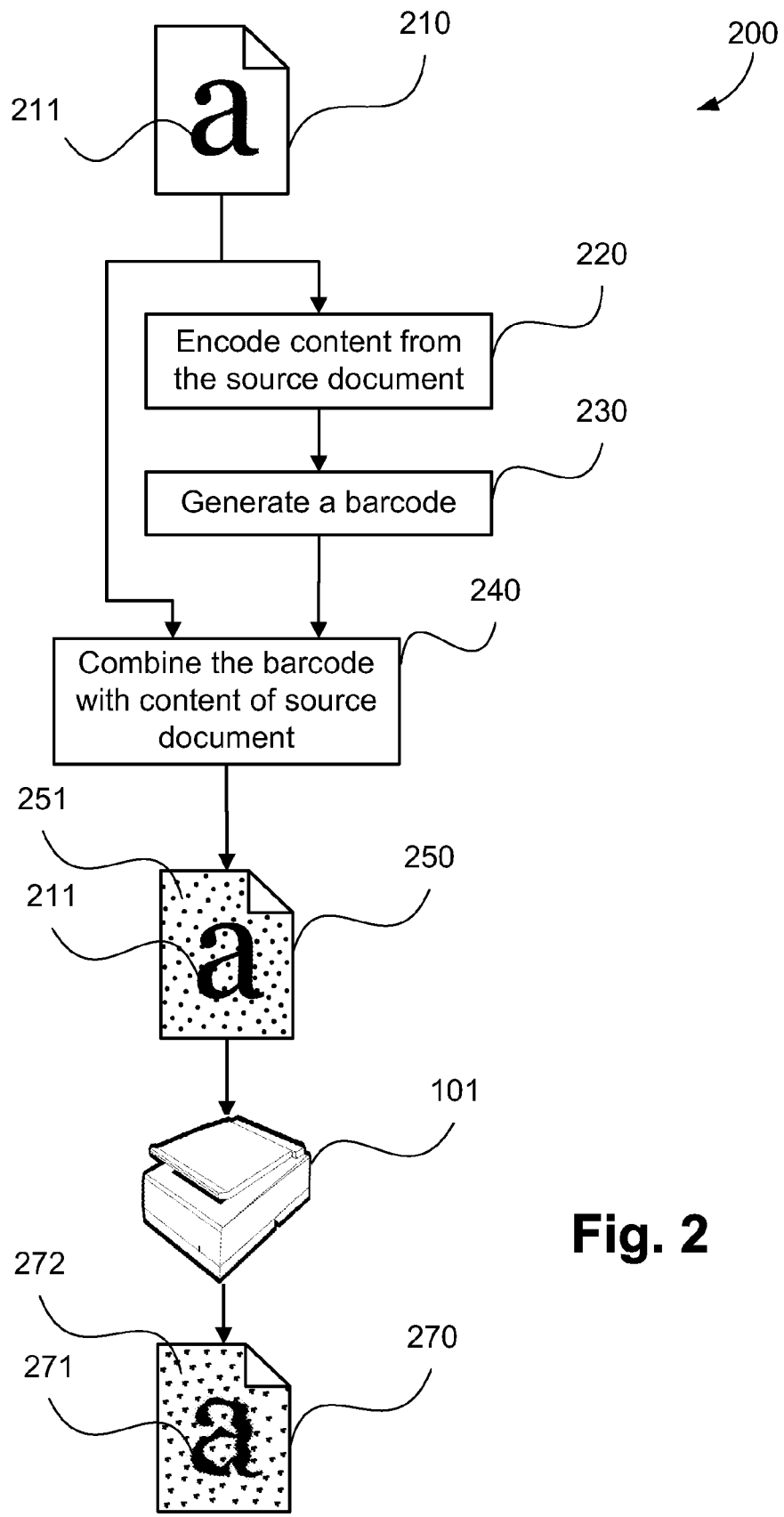
FIG. 2 is a schematic flow diagram showing a method of encoding a source document in order to generate a protected document.

A method 200 of encoding a source document 210 in order to generate a protected document 270 will now be described with reference to FIG. 2. The method 200 may be implemented as software resident on the storage device 109 and being controlled in its execution by the processor 105. As seen in FIG. 2, the source document 210 contains content 211 in digital form, such as pixel data generated from a digital document, or as output of a scanning process. The source document 210 may be generated from scanning a printed version of the source document 210, for example, using the device 101. The source document 210 in such a form may be stored in the RAM 170.

As seen in FIG. 2, a document 250 containing a barcode 251 is generated. The barcode 251 is generated such that the barcode 272 is collocated with the content 211 of the document 250, so that the content 211 and the barcode 251 are subject to the same degradation during printing and scanning. In the example of FIG. 2, the barcode 251 is a two-dimensional (2D) barcode consisting of barcode elements in the form of small dots distributed across the entire page of the document 250 as seen in FIG. 2. Alternatively, the barcode 251 may consist of other forms of barcode elements including lines, glyphs, or other marks. In one implementation, the barcode elements are square dots and the barcode 251 consists of the dots modulated spatially about nominal grid positions. The barcode generated in accordance with the described methods may also be a one-dimensional.

The method 200 begins at encoding step 220, where the processor 105 encodes the content 211 from the source document 210 to form an encoded representation of the content 211. The processor 105 may also encode other information from the source document 210 at step 220. Such other information may include document creation data, document workflow permissions and document authorship. The processor 105 encodes the content 211 so that the content 211 is suitable for embedding into the barcode 251. A method 300 of encoding the content, as executed at step 220, will be described in detail below with reference to FIG. 3.

At barcode generation step 230, the processor 105 generates a barcode 251 from the encoded representation of the content 211. As described above, the barcode 251 is a 2D barcode consisting of dots. Alternatively, the barcode 251 may be a one-dimensional barcode. The barcode 251 may consist of lines, dots, glyphs, or other marks. Alignment data can also be encoded into the generated barcode so that the encoded content 211 can be aligned with the document 250 during a later decoding process.

At compositing step 240, the processor 105 combines the barcode 251 generated at step 230 with the source document 210 to form an encoded document 250 comprising content 211 and the encoded barcode 251. Accordingly, the document 250 includes the content 211 and the barcode 251. The barcode 251 comprises a plurality of barcode elements each having a predetermined form. In particular, as seen in FIG. 2, the barcode 251 consists of a plurality of barcode elements in the form of small dots of size 3×3 pixels, whose position modulation from a regular grid encodes data. However, any suitable barcode scheme may be used to generate the barcode 251 for the document 250. The generated barcode 251 is overlaid on the source document 210, such that the dots of the barcode 251 cover the content 211, obscuring the content 211 slightly. In cases where the barcode 251 is not combined with the document content 211, step 240 may not be performed.

Figure 3:
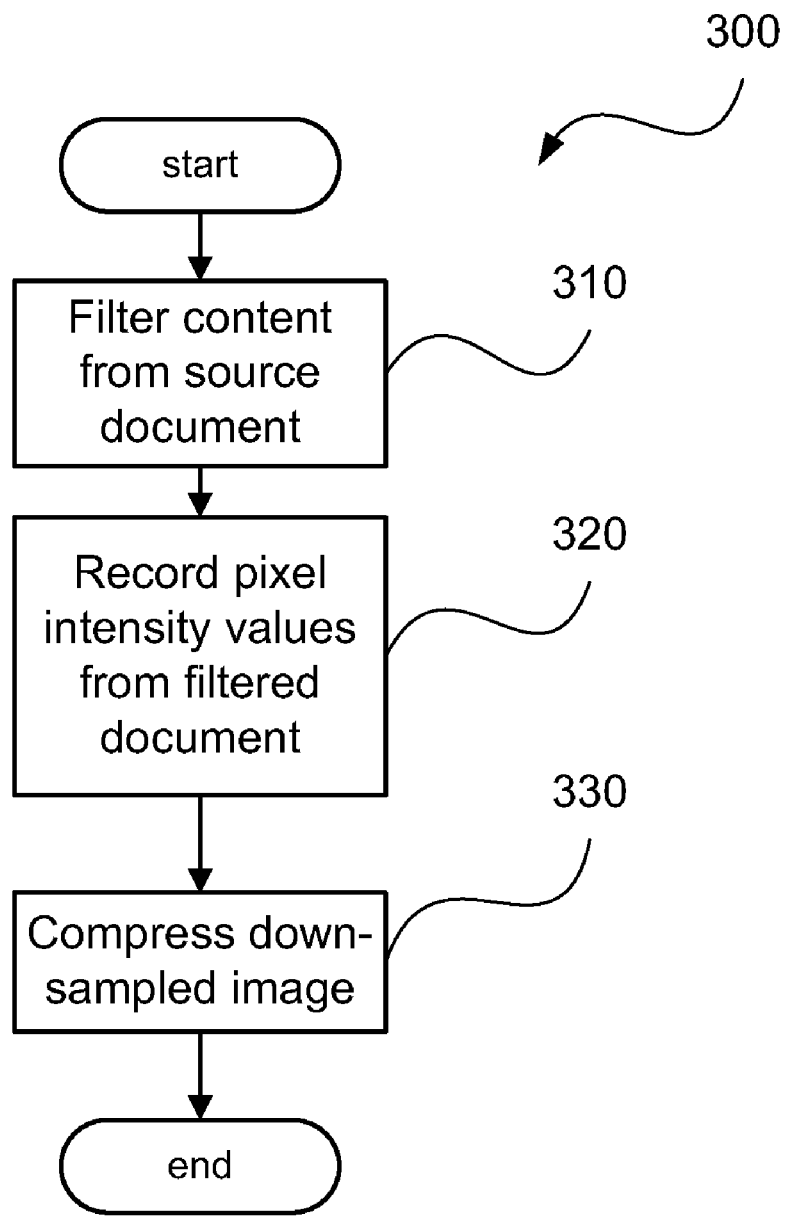
FIG. 3 is a schematic flow diagram showing a method of encoding content of the source document, as executed in the method of FIG. 2.

The method 300 of encoding the content 211 of the source document 210, as executed at step 220, will be described in detail below with reference to FIG. 3. The method 300 may be implemented as software resident on the storage module 109 and being controlled in its execution by the processor 105.

The method 300 generates the encoded representation of the content 211 from the source document 210.

The method 300 begins at a low-pass filtering step 310, where the processor 105 blurs the content 211 from the source document 210 with a Gaussian blur kernel, in preparation for a down-sampling operation. One such blur kernel has vertical and horizontal dimensions of thirty-two (32) pixels for an input image with resolution of six hundred (600) dots per inch. The method 300 may also use other types of filtering such as band-pass filtering or adaptive filtering.

At a next sampling step 320, the processor 105 records pixel intensity values from the blurred document at equidistant intervals of sixteen (16) pixels to generate a down-sampled image. The down-sampled image may be stored in the RAM 170. Alternatively, pixels of the blurred document are summed in equally spaced, overlapping cell areas. Structure information may then be extracted from these equally spaced cells to generate the down-sampled image.

The method 300 concludes at a compression step 330, where the processor 105 reduces the size of the down-sampled image using any suitable lossless compression algorithm with error correction, to generate the encoded representation of the content 211 from the source document 210.

The encoded document 250 is printed onto a medium such as paper or product packaging by the device 101, forming a protected document 270 comprising printed content 271 and printed barcode 272. The document 270 is protected in two ways. First, the barcode 272 acts as a visible deterrent to tamper. Second, the barcode 272 may be extracted and used to detect alteration of the document 270 since the original source document 210 was protected.

Figure 4:
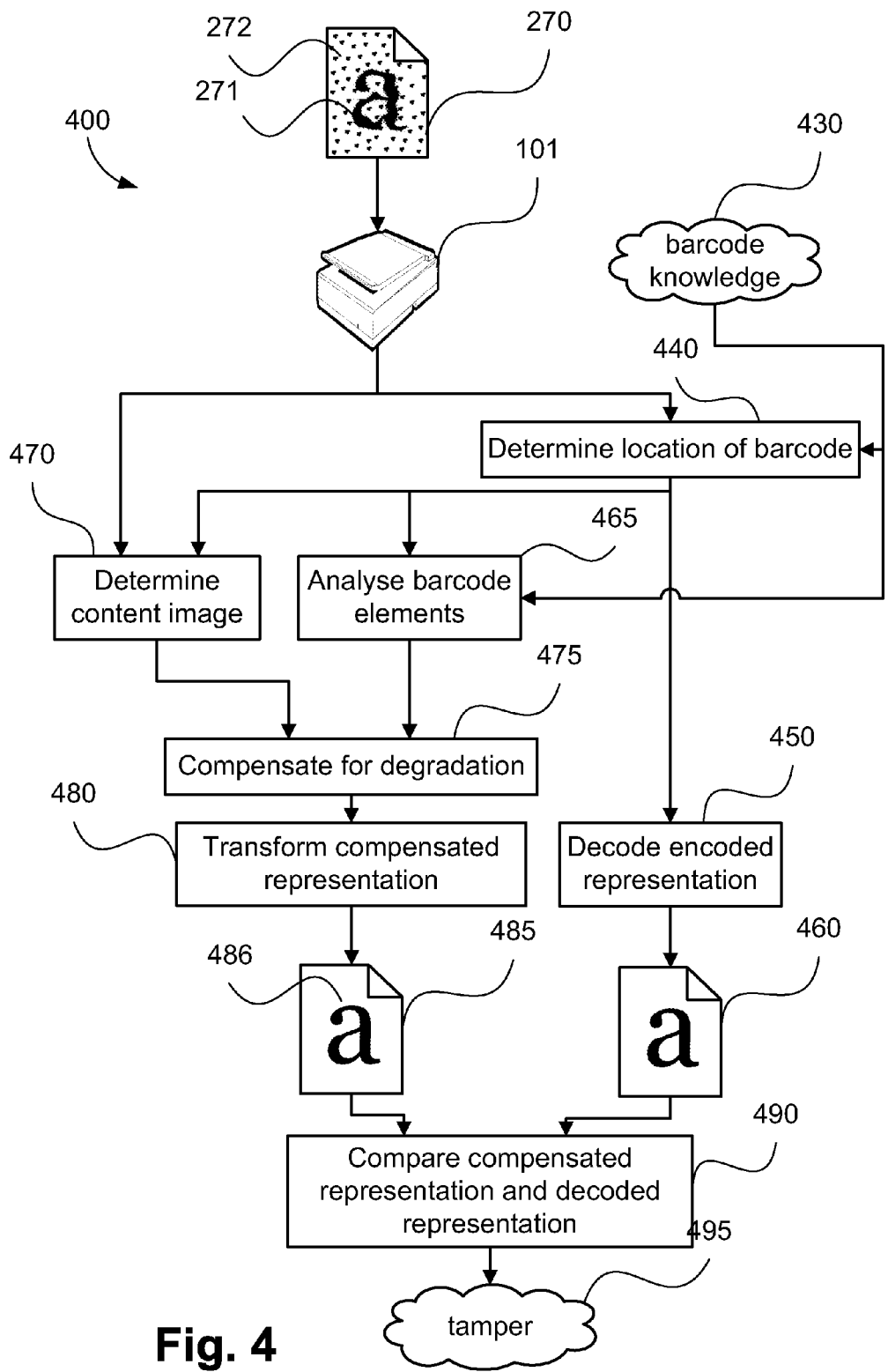
FIG. 4 is a schematic flow diagram showing a method of authenticating a printed document.

FIG. 4 is a schematic block diagram showing a method 400 of authenticating a printed document. The printed document may be referred to as a first document. The method 400 will be described by way of example with reference to the printed document 270. Again, the method 400 may be implemented as one or more code modules of the software application program 133 resident in the storage module 109 and being controlled in its execution by the processor 105.

In the example, the recipient of the printed document 270 comprising the barcode 272 and content 271 suspects that the document 270 has been tampered with and would like to verify the authenticity of the content 271. As described above, the barcode 272 comprises a plurality of barcode elements each having a predetermined form. In particular, the barcode 272 comprises a plurality of barcode elements in the form of dots. Prior to execution of the method 400, the printed document 270 is digitised by device 101 using the scanning function to generate an original scanned image of the printed document 270. The original scanned image of the printed document 270 may be referred to as a representation of the printed document 270 (or first document). The scanned image may be stored in the RAM 170.

The method 400 begins at barcode detection step 440, where the processor 105 performs the step of detecting the plurality of barcode elements of the barcode 272 in the scanned image of the printed document 270. In particular, the processor 105 determines a page location for at least a portion of the barcode elements of the barcode 272. In step 440, the processor 105 iterates over pixels in the scanned image searching for pixel patterns that closely match prior knowledge 430 of the form of the barcode 272. The prior knowledge may be stored in the storage module 109 of the device 101.

At barcode analysis step 465, the processor 105 performs the step of determining a visual difference between each of the detected plurality of barcode elements and a predetermined form of the barcode element. In particular, the processor 105 analyses the detected barcode elements to determine one or more statistics indicating how the detected barcode elements differ from elements in the expected predetermined form of the barcode 272. When the barcode elements are spatially distinct, meaning that the barcode elements do not overlap, the difference may be determined at step 465 by estimating a point spread function (PSF) for the barcode elements. Methods for estimating the point spread function include frequency-based de-convolution, iterative predictive methods, and regressively fitting to a known distribution such as an exponential or Gaussian. When the barcode elements are not spatially distinct, statistics may be calculated in a spatial frequency domain.

A method 500 of deriving an estimate of a point spread function, as executed at step 465, will now be described with reference to FIGS. 5A and 5B. Again, the method 500 may be implemented as one or more code modules of the software application program 133 resident in the storage module 109 and being controlled in its execution by the processor 105.

Figure 5A:
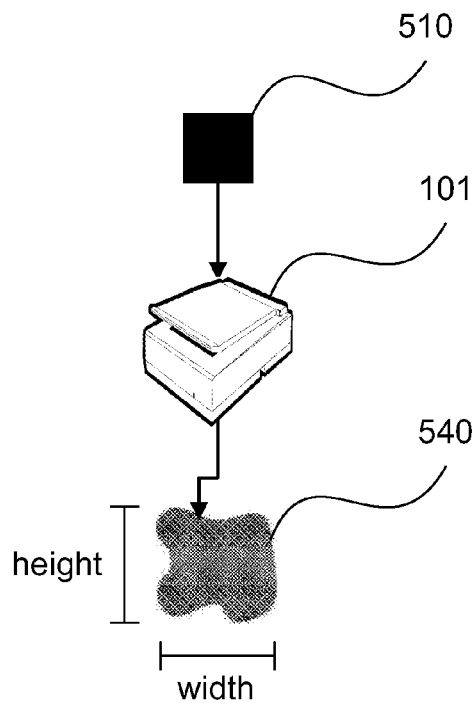
FIGS. 5A and 5B form a schematic flow diagram showing a method of deriving an estimate of a point spread function.
Figure 5B:
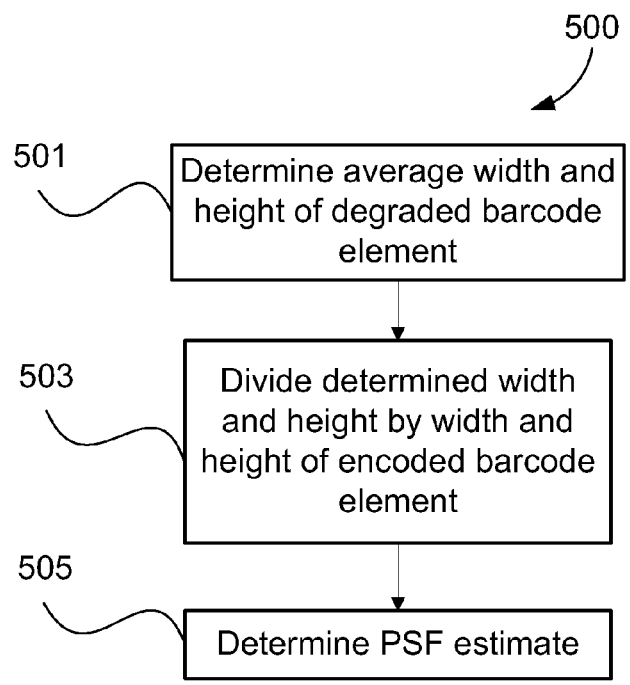

As seen in FIG. 5A, an encoded barcode element 510 may be printed by the printer function of the device 101 and scanned by the scanning function of the device 101, resulting in a scanned image (or representation) of a degraded barcode element 540. Printing typically induces print growth through dot gain, where features of content are larger than their original form. Scanning induces blurring, reducing contrast and spreading content features. The image of the degraded barcode element 540 may be stored in the RAM 170.

The method 500 begins at step 501, where the processor 105 determines the average spatial width and height of the degraded barcode element 540. Then at step 503, the processor 105 divides the measured width and height by the width and height of the encoded barcode element 510. In the example of FIG. 5A, the encoded barcode element 510 is a square dot of dimensions 3×3 pixels and the degraded barcode element 540 is of dimensions 4×4 pixels. Dividing the degraded width and height by the encoded width and height gives an estimated dot gain of 1.333 in both width and height. If the resolution associated with the scanning function of the device 101 is higher than the resolution of the printed document 270 then the dot gain measurement will be more accurate.

The method 500 concludes at the next step 505, where the processor 105 determines an overall visual adjustment factor in the form of the PSF estimate by averaging dot gain measurements, either globally for the entire barcode, or locally for small regions of the barcode (e.g., a selected area of barcode 272 containing a relatively small number of barcode elements). Accordingly, at step 505, the processor 105 may perform the step of combining the determined visual differences for the detected barcode elements. The width and height measurements determined at step 501 are combined but may be kept separate, providing more information to further processing steps.

Alternative characterizations of barcode statistics include image moments, non-linear dot gain modelling, or change in pixel contrast or gamma, although this list is not exhaustive. In one implementation, step 465 may be executed during the barcode detection step 440. Accordingly, the visual difference may be determined (e.g., as at step 465, and steps 670, 770 and 870 (to be discussed in further detail below)) by estimating higher order image moments for the detected plurality of barcode elements or by estimating non-linear dot gain for the detected plurality of barcode elements. In another alternative, the visual difference may be determined (e.g., as at steps 465, 670, 770 and 870) by estimating a change in contrast in the detected barcode elements. In still another alternative, the visual difference may be determined (e.g., as at steps 465, 670, 770 and 870) by estimating a change in gamma in the detected barcode elements. In still another alternative, the visual difference may be determined (e.g., as at steps 465, 670, 770 and 870) by estimating a change in brightness in the detected barcode elements.

Returning to FIG. 4, at content separation step 470, the processor 105 uses the results of the barcode detection step 440 to separate the content 271 from the barcode 272 on the scanned image (or representation) of the document 270. A result of step 470 is a content image which may be stored in RAM 170. The content image is the scanned image (or representation) of the document 270 with the barcode 272 removed. In one implementation, step 470 is performed by masking out the locations of the barcode elements from the scanned image of the document 270, leaving just the content image. However, any suitable method may be used at step 470 to separate the content 271 from the barcode 272 within the scanned image of the document 270. In another implementation, step 470 may be omitted where the implementation does not require that the barcode 272 be separated from the content 271.

The method 400 continues at compensation step 475, where the processor 105 performs the step of modifying the content of the content image based on the visual differences determined in step 465. In particular, the processor 105 uses the statistics determined in step 465 to compensate for the degradation of the content 271 of the document 270 during printing and scanning of the document 270. The content image generated at step 470 is filtered with a Richardson-Lucy iterative de-convolution algorithm in order to generate a compensated image. The compensated image is the content image after filtering.

The Richardson-Lucy iterative de-convolution algorithm maximises the statistical likelihood of image pixel values corresponding to the scanned image of the document 270 being determined from the degraded image pixel values, given a point spread function (PSF). Regular non-iterative de-convolution is subject to noise caused by a loss of high frequency information during printing and scanning because the PSF is usually a low pass function. The Richardson-Lucy algorithm minimises these problems by assuming the degradation was due to a PSF with a Poisson distribution and converging to a maximum likelihood solution. The Poisson assumption is reasonable for modelling the dispersion of ink or toner as the ink or toner is printed onto paper and is also reasonable for the blurring associated with a scanning process. The Richardson-Lucy algorithm is robust to small errors in the estimated PSF. While iterative de-convolution may be computationally expensive, reasonably accurate Richardson-Lucy results may be obtained with less than ten iterations. The Richard-Lucy algorithm amplifies noise somewhat and adds ringing artifacts to sharp edges in the content. However, such artifacts are lesser than the improvement gained when the image is used for subsequent comparison for use in anti-tamper. Accordingly, de-convolution of the PSF may be performed from content of the document 270. Step 475 may result in the removing of at least some of the degradation of the content (e.g., 271) of the document 270 from the content image representing the document 270.

An alternative de-convolution method which is suitable for use at step 475 is the Landweber algorithm The Landweber algorithm gives a least squares minimisation solution to estimating the original scanned image of the document 270. Other alternative methods for compensating for degradation include building an inverse model for the impact of dot gain or print growth, image moments, change in pixel contrast or gamma, or a PSF. In one form, such an inverse model may be a lookup table derived from empirical analysis of many printed and scanned pages. For example, one entry in the lookup table may initiate a morphological erosion operation when high dot gain is detected.

Compensation may be applied locally if the statistics determined at step 465 are calculated locally. The output of step 465 for a region of the original scanned image of the document 270 is used at step 475 to compensate for the degradation of content within the region.

At transforming step 480, the processor 105 transforms the compensated image from step 475 into a compensated representation 485 with compensated content 486. The compensated representation 485 is a modified version of the scanned image (or representation of the printed document 270) and may be stored in the RAM 170. The compensated representation 485 may be subsequently compared with a decoded representation 460 (or second document) in a transformed domain, as will be described in further detail below.

At step 480, the processor 105 performs a similar function to encoding step 220. In particular, the processor 105 applies down-sampling to the compensated image. The processor 105 may also provide an alignment function to align the compensated content 486 with the decoded representation 460 using alignment information from the barcode 272.

In one implementation, step 480 may be performed before step 475, in which case, step 480 operates on a transformed representation of the document 270. Performing step 480 before step 475 may be advantageous if the transformed domain has a lower resolution than the original scanned image of the document 270. Alternatively, the processor 105 may operate on the decoded representation 460, transforming the decoded representation 460 into a form that may be compared with the compensated representation 485. If the compensated representation 485 and the decoded representation 460 can be compared without transformation then step 480 may be skipped.

At barcode decoder step 450, the processor 105 performs the step of decoding the barcode 272 in the scanned image of the barcode of the document 270 to determine a second document in the form of the decoded representation 460. In particular, the processor 105 uses the output of step 440 to determine the decoded representation 460 from the barcode 272. The decoded representation 460 is a decompressed version of the encoded representation of the content 211 from the source document 210, which was encoded into the barcode 251 at step 230 of FIG. 2.

The method 400 continues at comparison step 490, where the processor 105 performs the step of comparing the compensated representation 485 with the decoded representation 460, in order to authenticate the document 270 (i.e., the first document). In particular, at step 490, the processor 105 performs a difference operation between the compensated representation 485 and the decoded representation 460, outputting a two-dimensional indication of tamper 495. If the representations 485 and 460 are in an image domain then the difference is a pixel-wise subtraction. Accordingly, the comparison at step 490 is a subtraction between pixel values of the document 270 as represented by the compensated representation 485 and pixel values of the document as represented by the decoded representation 460 (or second document).

If the compensated representation 485 and the decoded representation 460 are in a compressed or otherwise transformed domain, then the processor 105 may need to decompress the compensated representation 485 and the decoded representation 460 locally to perform the comparison at step 490.

The indicated tamper 495 contains less noise due to print and scan artifacts than a conventional anti-tamper process that does not use analysis of barcode degradation to compensate for print and scan artifacts. Thus, the method 400 is able to distinguish true tamper from environmental noise with greater reliability and fewer false indications.

Figure 6:
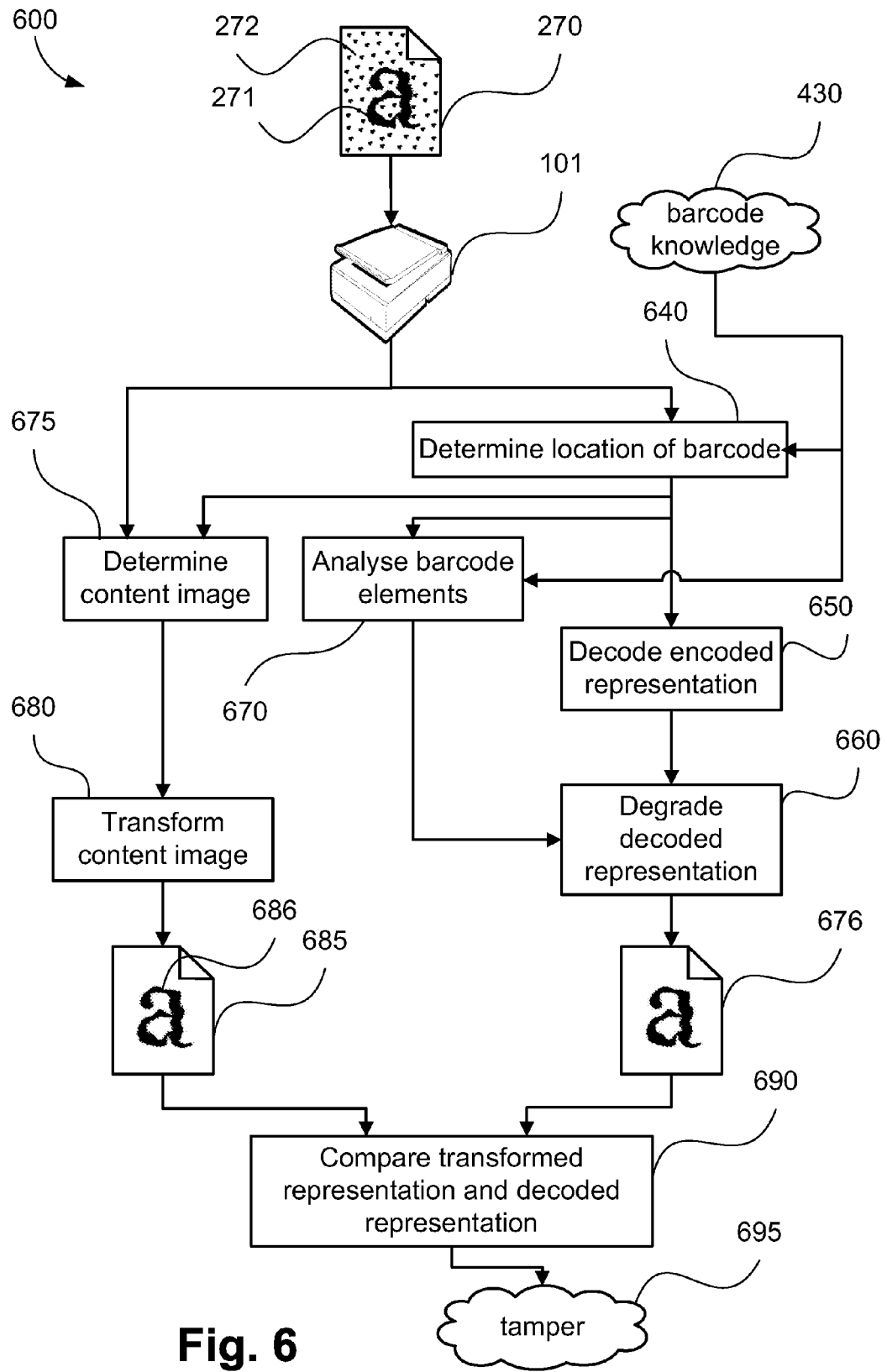
FIG. 6 is a schematic flow diagram showing another method of authenticating a printed document.

Another method 600 of authenticating a printed document will be described below with reference to FIG. 6. The method 600 will be described by way of example with reference to the printed document 270. Again, the method 600 may be implemented as one or more code modules of the software application program 133 resident in the storage module 109 and being controlled in its execution by the processor 105.

The method 600 is a variation on the method 400 where instead of compensating for the print and scan degradation, a model of the degradation is applied to the decoded representation 460 of the document 270. Accordingly, a comparison performed at step 690 is effectively between two degraded representations of the document 270. The method 600 may be used when it is easier to model degradation directly rather than deriving and using an inverse degradation model to compensate for degradation, as described above in relation to the method 400.

Again, prior to execution of the method 600, the printed document 270 is digitised by device 101 using the scanning function to generate an original scanned image representation of the document 270. The scanned image may be stored in the RAM 170.

The method 600 begins at barcode detection step 640, where the processor 105 performs the step of detecting the plurality of barcode elements of the barcode 272 in the scanned image of the printed document 270. In particular, the processor 105 determines a page location for at least a portion of the barcode elements of the barcode 272. As described above, the barcode elements are dots. In step 640, the processor 105 iterates over pixels in the scanned image searching for pixel patterns that closely match the prior knowledge 430 of the form of the barcode 272. The prior knowledge 430 may be stored in the storage module 109 of the device 101.

At barcode analysis step 670, the processor 105 performs the step of determining a visual difference between each of the detected plurality of barcode elements and a predetermined form of the barcode element. In particular, the processor 105 analyses the detected barcode elements to determine one or more statistics indicating how the detected barcode elements differ from elements in the expected predetermined form of the barcode 272. Again, when the barcode elements are spatially distinct, meaning that the barcode elements do not overlap, the difference may be determined at step 670 by estimating a point spread function (PSF) in accordance with the method 500.

At content separation step 675, the processor 105 uses the results of the barcode detection step 640 to separate the content 271 from the barcode 272 on the scanned image (or representation) of the document 270. The result of step 675 is a content image which may be stored in RAM 170. The content image is the scanned image (or representation) of the document 270 with the barcode 272 removed. In one implementation, step 675 is performed by masking out the locations of the barcode elements from the scanned image of the document 270, leaving just the content image. However, any suitable method may be used at step 675 to separate the content 271 from the barcode 272 within the scanned image of the document 270. In another implementation, step 675 may be omitted where the implementation does not require that the barcode 272 be separated from the content 271.

At transforming step 680, the processor 105 transforms the content image from step 675 into the representation 685 with content 686. The representation 685 is the content image after transformation. The content representation 685 is a modified version of the scanned image (or representation of the printed document 270) and may be stored in the RAM 170. Again, step 680 may be performed before step 675, in which case, step 680 operates on a transformed representation of the document 270.

At barcode decoder step 650, the processor 105 uses the scanned image of the printed document 270 to perform the step of decoding the barcode 272 (or the scanned image of the barcode) to determine a second document in the form of a decoded representation (not shown). In particular, step 650 uses the output of step 640 to determine the decoded representation from the barcode 272. The decoded representation is a decompressed version of the encoded representation of the content 211, which was encoded into the barcode 251 at step 230 of FIG. 2. The decoded representation may be stored in the RAM 170.

The method 600 continues at a degrading step 660, where the processor 105 performs the step of degrading contents of the decoded representation (or second document) in accordance with the degradation of the contents of the document 270. In particular, the processor 105 uses the calculated statistics from step 670 to degrade the decoded representation from step 650 in a manner that emulates the degradation introduced by the print and scan processes. The output of step 660 is a degraded representation 676. Methods for emulating degradation include the inverse operations of those performed at 475 of the method 400. In this case, the decoded representation output at step 650 is convolved in the spatial domain with the estimate of the PSF calculated step 670. Accordingly, the processor 105 performs the step of convolving the PSF with the contents of the decoded representation.

Alternatively, models of dot gain or print growth, image moments, or changes in pixel contrast or gamma, may be applied to the decoded representation from step 650. Such a model may take the form of a lookup table derived from empirical analysis of many printed and scanned pages. For example, one entry in such a table may initiate a morphological dilation operation when high dot gain is detected.

The method 600 continues at comparison step 690, where the processor 105 compares the content representation 685 with the degraded representation 676, in order to authenticate the document 270 (i.e., the first document). In particular, at step 690, the processor 105 performs a difference operation between the compensated representation 685 and the degraded representation 676, outputting a two-dimensional indication of tamper 695. If the representations 685 and 676 are in the image domain then the difference is a pixel-wise subtraction. If the representations 685 and the 676 are in a compressed or otherwise transformed domain, then the processor 105 may need to decompress the representations 685 and 676 locally to perform the comparison at step 690.

Accordingly, step 690 is substantially the same as step 490 but both the representations 685 and 676 are degraded representations rather than compensated representations. Despite this difference, the indicated tamper 695 is almost identical to the indicated tamper 495.

One advantage of the method 600 is that degradation to emulate print and scan processes may be simpler and more efficient to implement than compensation for the same print and scan processes.

Figure 7:
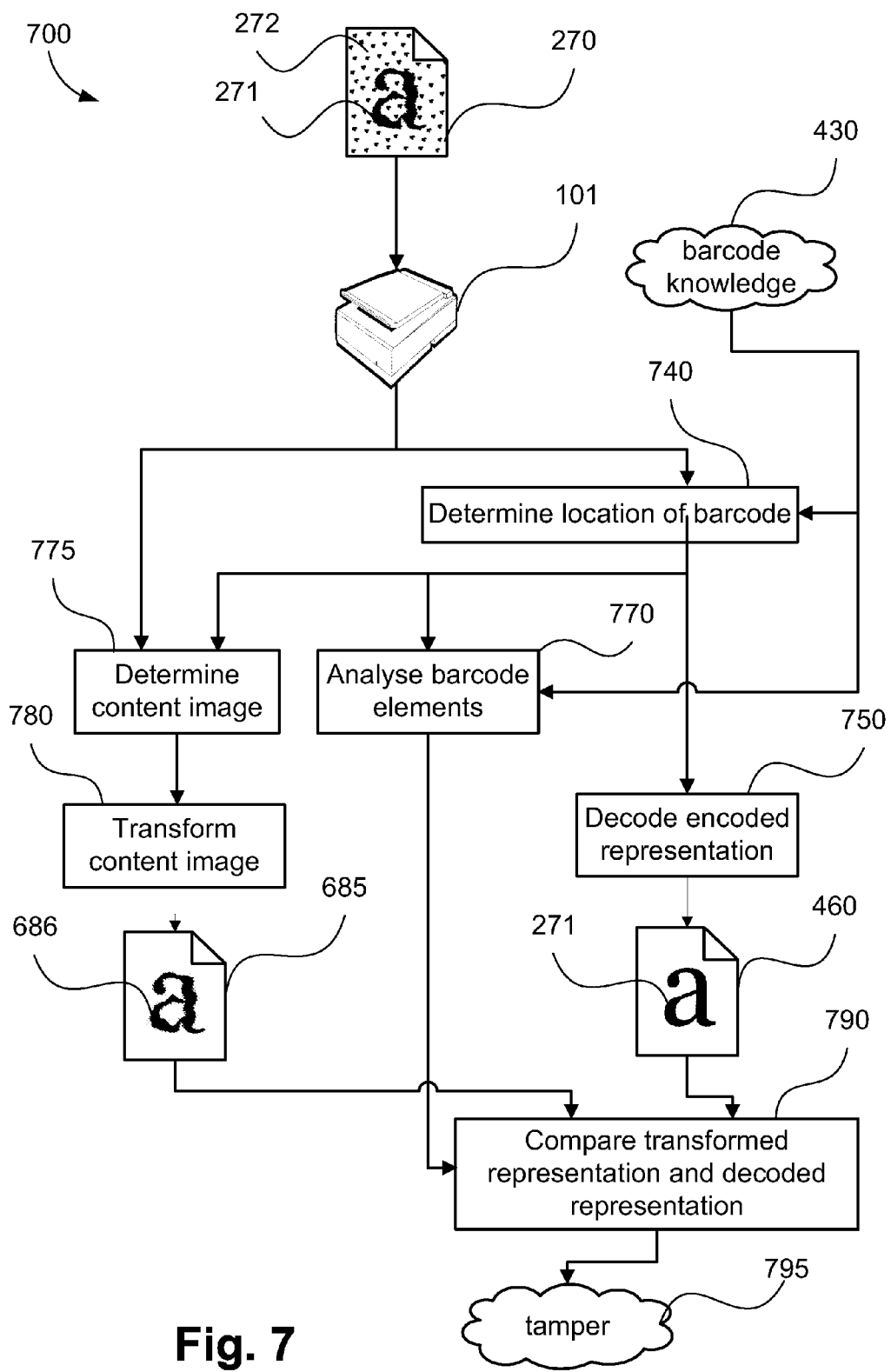
FIG. 7 is a schematic flow diagram showing another method of authenticating a printed document.

FIG. 7 is a schematic block diagram showing another method 700 of authenticating a printed document. As above, the printed document may be referred to as the first document.

The method 700 will be described by way of example with reference to the printed document 270. Again, the method 700 may be implemented as one or more code modules of the software application program 133 resident in the storage module 109 and being controlled in its execution by the processor 105. The method 700 is a variation on the method 400 and 600 where the barcode degradation statistics are used to modify the comparison process (e.g., at steps 490 and 690) directly rather than being used to modify one of the inputs to the comparison process.

Again, prior to execution of the method 700, the printed document 270 is digitised by device 101 using the scanning function to generate an original scanned image of the document 270. Again, the original scanned image of the printed document 270 may be referred to as a representation of the printed document 270 (or first document). The scanned image may be stored in the RAM 170.

The method 700 begins at barcode detection step 740, where the processor 105 performs the step of detecting the plurality of barcode elements of the barcode 272 in the scanned image of the printed document 270. In particular, the processor 105 determines a page location for at least a portion of the barcode elements of the barcode 272. As described above, the barcode elements are dots. In step 740, the processor 105 iterates over pixels in the scanned image searching for pixel patterns that closely match the prior knowledge 430 of the form of the barcode 272. The prior knowledge 430 may be stored in the storage module 109 of the device 101.

At barcode analysis step 770, the processor 105 performs the step of determining a visual difference between each of the detected plurality of barcode elements and a predetermined form of the barcode element. In particular, the processor 105 analyses the detected barcode elements to determine one or more statistics indicating how the detected barcode elements differ from elements in the expected predetermined form of the barcode 272. Again, when the barcode elements are spatially distinct, meaning that the barcode elements do not overlap, the difference may be determined at step 770 by estimating a point spread function (PSF) in accordance with the method 500.

At content separation step 775, the processor 105 uses the results of the barcode detection step 740 to separate the content 271 from the barcode 272 on the scanned image (or representation) of the document 270. The result of step 775 is a content image which may be stored in RAM 170. Again, the content image is the scanned image (or representation) of the document 270 with the barcode 272 removed. In one implementation, step 775 is performed by masking out the locations of the barcode elements from the scanned image of the document 270, leaving just the content image. However, any suitable method may be used at step 775 to separate the content 271 from the barcode 272 within the scanned image of the document 270. In another implementation, step 775 may be omitted where the implementation does not require that the barcode 272 be separated from the content 271.

At transforming step 780, the processor 105 transforms the content image from step 675 into the representation 685 with content 686. The representation 685 may be stored in the RAM 170. Again, step 780 may be performed before step 775, in which case, step 780 operates on a transformed representation of the document 270.

At barcode decoder step 750, the processor 105 performs the step of decoding the barcode 272 (or the scanned image of the barcode) to determine a second document in the form of the decoded representation 460. In particular, the processor 105 uses the output of step 740 to determine decoded representation 460 from the barcode 272. As described above, the decoded representation 460 is a decompressed version of the encoded representation of the content 211 which was encoded into the barcode 251 at step 230 of FIG. 2. The decoded representation 460 may be stored in the RAM 170.

The method 700 continues at comparison step 790, where the processor 105 takes as inputs the content representation 685, the decoded representation 460, and calculated statistics from step 770, producing indicated tamper 795. In particular, the comparison performed at step 790 is a difference operation, as with the methods 400 and 600, but is biased by the calculated statistics. Accordingly, the processor 105 performs the step of biasing the comparison at step 790. The bias may be linear or non-linear with respect to the calculated statistics and may be calculated from global or local barcode statistics. For example, the comparison bias may be derived from an estimate of barcode degradation global to the document 270.

Alternatively, the comparison bias may be derived based on an estimate of barcode degradation in a region local to the region of image comparison. The comparison bias may be linear with respect to the visual difference between each of the detected plurality of barcode elements and a predetermined form of the barcode element. In the method 700, the bias is obtained from a lookup table derived from empirical analysis of many printed and scanned pages. The description below assumes light pixels have high pixel values and dark pixels have low pixel values. If the barcode statistics determined at step 770 imply high dot gain in a local region then a positive bias is added to a difference between the content representation 685 and the decoded representation 460 for pixels within that local region. If the barcode statistics determined at step 770 imply a constant reduction in global contrast then, for dark pixels or regions in the content representation 685, a negative bias is added to a difference between the content representation 685 and the decoded representation 460. For light pixels or regions, a positive bias is added to a difference between the content representation 685 and the decoded representation 460.

One advantage of the method 700 is that modifying the comparison by taking into account barcode degradation statistics may be more efficient than processing the content representation or the decoded representation.

The methods 400, 600 and 700 may also be used to address general problems of print quality when a barcode is collocated with content on a document.

Figure 8:
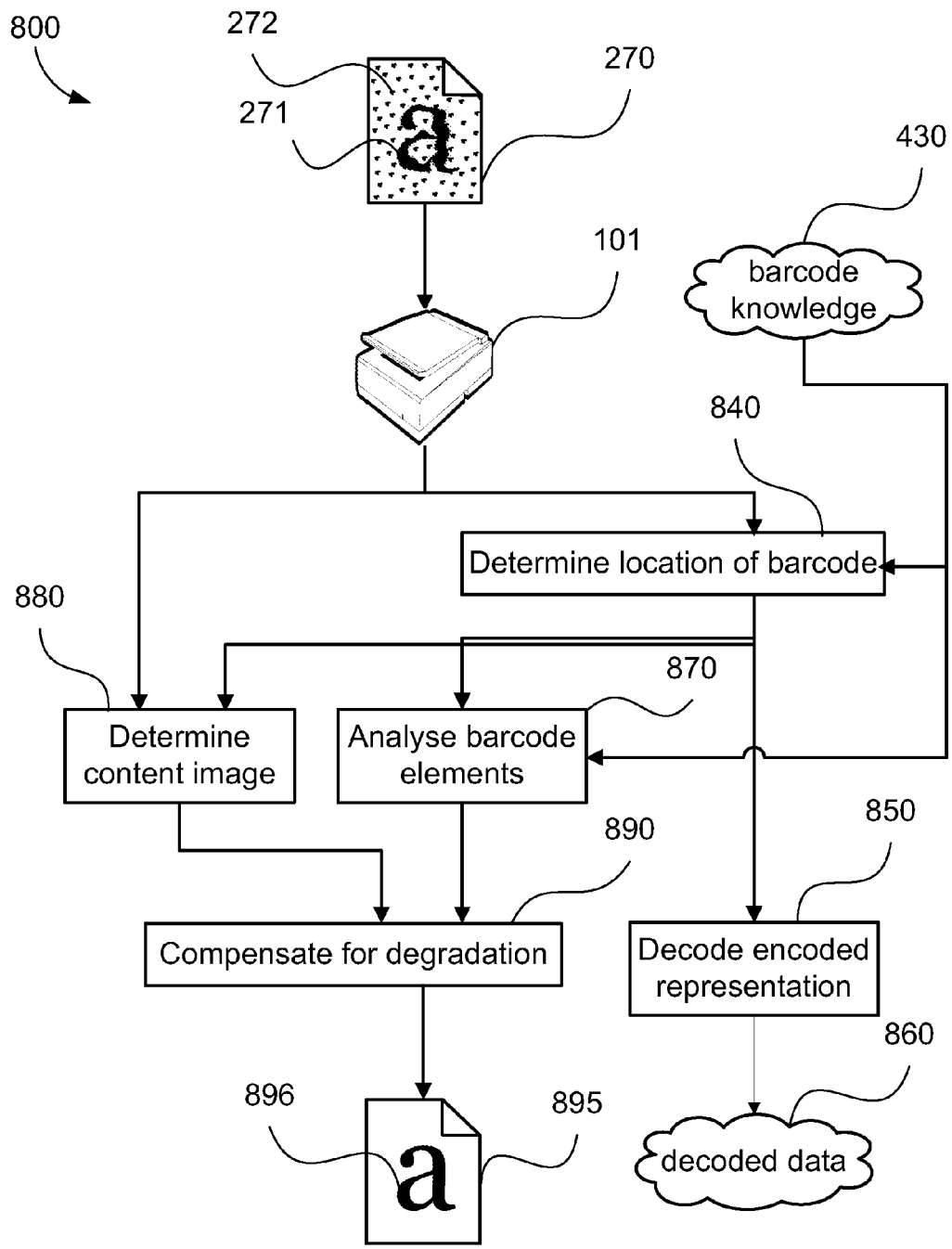
FIG. 8 is a schematic flow diagram showing a method of compensating for the degradation that occurred to a printed document during printing and subsequent scanning processes.

FIG. 8 is a schematic block diagram showing a method 800 of compensating for the degradation that occurred to a printed document during printing and subsequent scanning processes. The method 800 is executed to improve the print quality of the contents of a printed document.

The method 800 will be described by way of example with reference to the printed document 270. Again, the printed document 270 may be referred to as a first document. Again, the method 800 may be implemented as one or more code modules of the software application program 133 resident in the storage module 109 and being controlled in its execution by the processor 105.

In the method 800, the data encoded in the barcode 272 on the document 270 is not necessarily a representation of the source document (e.g., source document 210) but may be any arbitrary data which is related to the document 270 such as document identification information or details of the author of the document.

Again, prior to execution of the method 800, the printed document 270 is digitised by device 101 using the scanning function to generate an original scanned image of the document 270. Again, the original scanned image of the printed document 270 may be referred to as a representation of the printed document 270 (or first document). The scanned image may be stored in the RAM 170.

The method 800 begins at barcode detection step 840, where the processor 105 performs the step of detecting the plurality of barcode elements of the barcode 272 in the scanned image of the printed document 270. In particular, the processor 105 determines a page location for at least a portion of the barcode elements of the barcode 272. As described above, the barcode elements are dots. Alternatively, the barcode elements may be lines, glyphs or other marks. In step 840, the processor 105 iterates over pixels in the scanned image searching for pixel patterns that closely match the prior knowledge 430 of the form of the barcode 272 as stored in the storage module 109 of the device 101.

At barcode analysis step 870, the processor 105 performs the step of determining a visual difference between each of the detected plurality of barcode elements and a predetermined form of the barcode element. In particular, the processor 105 analyses the detected barcode elements to determine one or more statistics indicating how the detected barcode elements differ from elements in the expected form of the barcode 272. In particular, when the barcode elements are spatially distinct, meaning that the barcode elements do not overlap, the difference may be determined at step 870 by estimating a point spread function (PSF) in accordance with the method 500.

At content separation step 880, the processor 105 uses the results of the barcode detection step 840 to separate the content 271 from the barcode 272 on the scanned image (or representation) of the document 270. The result of step 880 is a content image, which may be stored in RAM 170. Again, the content image is the scanned image of the document 270 with the barcode 272 removed. In one implementation, step 880 is performed by masking out the locations of the barcode elements from the scanned image of the document 270, leaving just the content image. However, any suitable method may be used at step 880 to separate the content 271 from the barcode 272 within the scanned image of the document 270. In another implementation, step 880 may be omitted where the implementation does not require that the barcode 272 be separated from the content 271.

The method 800 continues at compensation step 890, where the processor 105 performs the step of modifying the content of the content image representing the document 270 based on the visual differences determined in step 870. In particular, the processor 105 uses the statistics determined in step 870 to compensate for the degradation of the content 271 of the document 270 during printing and scanning of the document 270. In particular, the content image generated at step 880 is filtered with a Richardson-Lucy iterative de-convolution algorithm in order to generate a compensated image 895 containing compensated content 896. The compensated image 895 is the content image after compensation and may be distributed electronically or further printed.

At barcode decoder step 850, the processor 105 uses the output of step 840 to determine decoded data 860 from the barcode 272. The method 800 uses the barcode 272 for the auxiliary purpose of compensating for degradation of the document 270 during printing and scanning processes.

One advantage of the method 800 is that multiple printing and scanning operations will result in the content 271 being less degraded (resulting in compensated content 896) than if compensation was not performed. It will also be appreciated that such an advantage may be achieved by analysing elements of the barcode located on the document without the need for any additional marks (e.g., marks specifically for determining or measuring degradation of document contents due to printing and scanning processes) being applied to the document.

INDUSTRIAL APPLICABILITY

The arrangements described are applicable to the computer and data processing industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of authenticating a first document including content and a barcode, said barcode comprising barcode elements each having a predetermined form, said method comprising the steps of:
   detecting a plurality of the barcode elements of the barcode in a representation of the first document;
   determining a visual difference between each of the detected barcode elements and the predetermined form of the barcode element;
   decoding the barcode to determine a second document; and
   comparing the first document and the second document based on the determined visual difference, in order to authenticate the first document,
   wherein at least the determining and decoding steps are implemented using a processor.

2. The method of claim 1, further comprising the step of removing at least some of the degradation of the content of the first document, using the determined visual difference.

3. The method of claim 1, further comprising the step of degrading content of the second document in accordance with the determined visual difference.

4. The method of claim 1, further comprising the step of biasing the comparison based on the determined visual difference.

5. The method of claim 1, wherein the visual difference is determined by estimating one or more of a point spread function (PSF) for the detected plurality of barcode elements, higher order image moments for the detected plurality of barcode elements, non-linear dot gain for the detected plurality of barcode elements, a change in contrast in the detected plurality of barcode elements, a change in gamma in the detected plurality of barcode elements, and a change in brightness in the detected plurality of barcode elements.

6. The method of claim 1, wherein the visual difference is determined by estimating one or more of a point spread function (PSF) for the detected plurality of barcode elements, higher order image moments for the detected plurality of barcode elements, non-linear dot gain for the detected plurality of barcode elements, a change in contrast in the detected plurality of barcode elements, a change in gamma in the detected plurality of barcode elements, and a change in brightness in the detected plurality of barcode elements, and wherein the method further comprises the step of performing de-convolution of the PSF from content of the first document.

7. The method of claim 1, wherein the visual difference is determined by estimating one or more of a point spread function (PSF) for the detected plurality of barcode elements, higher order image moments for the detected plurality of barcode elements, non-linear dot gain for the detected plurality of barcode elements, a change in contrast in the detected plurality of barcode elements, a change in gamma in the detected plurality of barcode elements, and a change in brightness in the detected plurality of barcode elements, and wherein the method further comprises the step of convolving the PSF with the content of the second document.

8. The method according to claim 1, further comprising the step of combining the determined visual difference for the detected plurality of barcode elements to form an overall visual adjustment factor for the first document.

9. The method of claim 1, wherein the barcode elements are dots and the 2-D barcode consists of dots modulated spatially about nominal grid positions.

10. The method of claim 1 wherein the comparison is a subtraction between pixel values of the representation of the first document and pixel values of the second document.

11. The method of claim 1, further comprising the step of biasing the comparison based on the determined visual difference, wherein the comparison bias is derived from an estimate of one or more of barcode degradation global to the first document or barcode degradation in a region local to the region of image comparison.

12. The method of claim 1, further comprising the step of biasing the comparison based on the determined visual difference, wherein the comparison bias is linear with respect to the visual difference.

13. The method of claim 1, further comprising the step of biasing the comparison based on the determined visual difference, wherein the comparison bias is read from a lookup table derived from empirical analysis of many printed and scanned pages.

14. A method of modifying a first document including content and a barcode encoding data related to the first document, said barcode comprising barcode elements each having a predetermined form, said method comprising the steps of:
    detecting a plurality of the barcode elements of the barcode in a representation of the first document;
    determining a visual difference between each of the detected barcode elements and the predetermined form of the barcode element; and
    removing at least some of the degradation of the content of the first document based on the determined visual difference, in order to compensate for degradation of the first document,
    wherein at least the determining and removing steps are implemented using a processor.

15. The method of claim 14, further comprising the step of decoding the barcode to determine a second document.

16. The method of claim 14, further comprising the steps of:
    decoding the barcode to determine a second document; and
    comparing the representation of the first document and the second document based on the determined visual difference, in order to authenticate the first document.

17. The method of claim 14, wherein the visual difference is determined by estimating one or more of a point spread function (PSF) for the detected plurality of barcode elements, higher order image moments for the detected plurality of barcode elements, non-linear dot gain for the detected plurality of barcode elements, a change in contrast in the detected plurality of barcode elements, a change in gamma in the detected plurality of barcode elements, and a change in brightness in the detected plurality of barcode elements.

18. The method of claim 14, wherein the visual difference is determined by estimating one or more of a point spread function (PSF) for the detected plurality of barcode elements, higher order image moments for the detected plurality of barcode elements, non-linear dot gain for the detected plurality of barcode elements, a change in contrast in the detected plurality of barcode elements, a change in gamma in the detected plurality of barcode elements, and a change in brightness in the detected plurality of barcode elements, and wherein the method further comprises the step of performing de-convolution of the PSF from content of the first document.

19. The method according to claim 14, further comprising the step of combining the determined visual difference for the detected plurality of barcode elements to form an overall visual adjustment factor for the first document.

20. The method of claim 14, wherein the barcode elements are dots and the 2-D barcode consists of dots modulated spatially about nominal grid positions.

21. An apparatus for authenticating a first document including content and a barcode, said barcode comprising barcode elements each having a predetermined form, said apparatus comprising:
    means for detecting a plurality of the barcode elements of the barcode in a representation of the first document;
    means for determining a visual difference between each of the detected barcode elements and the predetermined form of the barcode element;
    means for decoding the barcode to determine a second document; and
    means for comparing the first document and the second document based on the determined visual difference, in order to authenticate the first document.

22. A system for authenticating a first document including content and a barcode, said barcode comprising barcode elements each having a predetermined form, said system comprising:
    a memory for storing data and a computer program; and
    a processor coupled to said memory for executing said computer program, said computer program comprising instructions for:
        detecting a plurality of the barcode elements of the barcode in a representation of the first document;
        determining a visual difference between each of the detected barcode elements and the predetermined form of the barcode element;
        decoding the barcode to determine a second document; and
        comparing the first document and the second document based on the determined visual difference, in order to authenticate the first document.

23. A computer readable medium having a computer program recorded thereon for authenticating a first document including content and a barcode, said barcode comprising barcode elements each having a predetermined form, said program comprising:
    code for detecting a plurality of the barcode elements of the barcode in a representation of the first document;
    code for determining a visual difference between each of the detected barcode elements and the predetermined form of the barcode element;
    code for decoding the barcode to determine a second document; and
    comparing the first document and the second document based on the determined visual difference, in order to authenticate the first document.

24. An apparatus for modifying a first document including content and a barcode encoding data related to the first document, said barcode comprising barcode elements each having a predetermined form, said apparatus comprising:

means for detecting a plurality of the barcode elements of the barcode in a representation of the first document;

means for determining a visual difference between each of the detected barcode elements and the predetermined form of the barcode element; and means for removing at least some of the degradation of the content of the first document, using the representation, based on the determined visual difference, in order to compensate for degradation of the first document.

25. A system for modifying a first document including content and a barcode encoding data related to the first document, said barcode comprising barcode elements each having a predetermined form, said system comprising:

a memory for storing data and a computer program; and a processor coupled to said memory for executing said computer program, said computer program comprising instructions for:

detecting a plurality of the barcode elements of the barcode in a representation of the first document;

determining a visual difference between each of the detected barcode elements and the predetermined form of the barcode element; and removing at least some of the degradation of the content of the first document, using the representation, based on the determined visual difference, in order to compensate for degradation of the first document.

26. A computer readable medium having a computer program recorded thereon for modifying a first document including content and a barcode encoding data related to the first document, said barcode comprising barcode elements each having a predetermined form, said program comprising:

code for detecting a plurality of the barcode elements of the barcode in a representation of the first document;

code for determining a visual difference between each of the detected barcode elements and the predetermined form of the barcode element; and code for removing at least some of the degradation of the content of the first document, using the representation, based on the determined visual difference, in order to compensate for degradation of the first document.

* * * * *